United States Patent [19]

Kobayashi

[11] Patent Number: 5,405,929

[45] Date of Patent: Apr. 11, 1995

[54] CURABLE SILICONE COMPOSITION

[75] Inventor: Hideki Kobayashi, Chiba, Japan

[73] Assignee: Dow Corning Toray Silicone Co., Ltd., Tokyo, Japan

[21] Appl. No.: 247,177

[22] Filed: May 20, 1994

[30] Foreign Application Priority Data

Jun. 30, 1993 [JP] Japan .................................. 5-186650

[51] Int. Cl.$^6$ ............................................. C08G 77/06
[52] U.S. Cl. ...................................... 528/15; 427/387; 524/730
[58] Field of Search .................. 528/15; 524/730, 265, 524/263; 427/387

[56] References Cited

U.S. PATENT DOCUMENTS 5,120,810  6/1992  Fujiki et al. ........................... 528/15

FOREIGN PATENT DOCUMENTS 88-048901  12/1984  Japan .

Primary Examiner—Melvyn I. Marquis
Attorney, Agent, or Firm—Alexander Weitz

[57] ABSTRACT

A silicone composition having utility as an oil and water repellent coating for substrates when cured thereon is disclosed, said composition comprising:

(A) 100 parts by weight of an organopolysiloxane that has a viscosity at 25° C. of at least 40 centipoise and that contains at least 2 alkenyl groups in each molecule;

(B) from 0.1 to 40 parts by weight of an organohydrogenpolysiloxane that contains at least 2 silicon-bonded hydrogen atoms in each molecule;

(C) from 0.01 to 10 parts by weight of a perfluoroalkyl-containing organosilane having the general formula $$C_nF_{2n+1}-R^2-\underset{R^1}{\underset{|}{Si}}H_a \qquad (3\text{-}a)$$

wherein $R^1$ represents a monovalent hydrocarbon group, $R^2$ represents a divalent hydrocarbon group, a is 2 or 3, and n is a number having a value of 4 to 12, with the proviso that $R^1$ is not an alkenyl group; and (D) a catalytic quantity of a hydrosilylation-reaction catalyst.

16 Claims, No Drawings

5,405,929

CURABLE SILICONE COMPOSITION

FIELD OF INVENTION

The present invention relates to a curable silicone composition. More specifically, the present invention relates to a curable silicone composition that cures to form a film or coating that has excellent water repellency and excellent oil repellency.

BACKGROUND

It is known that organopolysiloxane-based curable silicone compositions cure to give films that exhibit water repellency, oil repellency, mold-lubrication, stain resistance, releasability, and so forth. An example of such curable silicone compositions is the composition comprising vinyl-containing organopolysiloxane, organohydrogenpolysiloxane, and platinum group metal catalyst (abbreviated below as the base composition). Japanese Patent Publication Number Sho 63-48901 teaches a mold-lubricating silicone composition comprising the above base composition plus a third component consisting of (perfluoroalkyl+SiH)-containing dimethylpolysiloxane. Japanese Patent Publication Number Hei 5-5872 teaches an adhesive composition comprising the above base composition plus a third component consisting of cyclic siloxane that contains SiH, Si-bonded fluoroalkyl, and epoxy group.

SUMMARY OF THE INVENTION

While the cured films afforded by the preceding compositions are water repellent and oil repellent, they are, nevertheless, not completely satisfactory for applications that demand higher levels of water repellency and oil repellency than these films can exhibit. In addition, the organopolysiloxanes making up the third components in the subject compositions are in each case difficult to manufacture and costly and therefore problematic from the point of view of practical applications.

The inventor has discovered that the addition of a special type of perfluoroalkyl-containing organosilane to a conventional curable silicone composition, as described above, results in a major improvement in the water repellency and oil repellency of the corresponding cured film.

The present invention therefore takes as its object the introduction of a curable silicone composition that cures to yield a film that has an excellent water repellency and excellent oil repellency, said composition comprising (A) 100 weight parts of an organopolysiloxane that has a viscosity at 25° C. of at least 40 centipoise and that contains at least 2 alkenyl groups in each molecule;

(B) 0.1 to 40 weight parts of an organohydrogenpolysiloxane that contains at least 2 silicon-bonded hydrogen atoms in each molecule;

(C) 0.01 to 10 weight parts of an perfluoroalkyl-containing organosilane with the following general formula

in which $R^1$ represents a monovalent hydrocarbon group, excluding alkenyl group, $R^2$ represents a divalent hydrocarbon group, a is 2 or 3, and n is a number having a value of 4 to 12; and (D) a catalytic quantity of a hydrosilylation-reaction catalyst.

DETAILED DESCRIPTION OF THE INVENTION

To explain the preceding in greater detail, the organopolysiloxane comprising component (A) is the base component of the invention composition, and it must contain at least 2 alkenyl groups in each molecule in order to crosslink with the organohydrogenpolysiloxane comprising component (B). Component (A) is to have a viscosity at 25° C. of at least 40 centipoise because the film afforded by the resulting cured composition is too weak when component (A) has a viscosity below 40 centipoise. Component (A) has the formula.

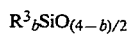

wherein $R^3$ is a monovalent hydrocarbon group or a halogenated hydrocarbon group having 1 to 10 carbon atoms and is exemplified by alkyl groups such as methyl, ethyl, propyl, and so forth; alkenyl groups such as vinyl, allyl, propenyl, 5-hexenyl, and so forth; aryl groups such as phenyl and so forth; and fluoroalkyl groups such as 3,3,3-trifluoropropyl, 3,3,4,4,,5,5,6,6,6-nonafluorohexyl, and so forth. The subscript b has an average value of 1.95 to 2.05. The molecular structure of the subject component is exemplified by straight chain and branched chain polymers, but straight chain polymers are preferred. The molecular chain terminal groups of component (A) are exemplified by trimethylsiloxy, dimethylvinylsiloxy, and dimethylhydroxysiloxy.

Component (A) is specifically exemplified by dimethylvinylsiloxy-terminated dimethylpolysiloxanes, dimethylvinylsiloxy-terminated methylvinylsiloxane-dimethylsiloxane copolymers, trimethylsiloxy-terminated methylvinylsiloxane-dimethylsiloxane copolymers, dimethylhydroxysiloxy-terminated methylvinylsiloxane-dimethylsiloxane copolymers, dimethylvinylsiloxy-terminated dimethylsiloxane-3,3,3-trifluoropropylmethylsiloxane copolymers, trimethylsiloxy-terminated methylvinylsiloxane-dimethylsiloxane-3,3,3-trifluoropropylmethyl siloxane copolymers, dimethylvinylsiloxy-terminated methylvinylsiloxane-3,3,3-trifluoropropylmethylsiloxane copolymers, dimethylhydroxysiloxy-terminated methylvinylsiloxane-3,3,3-trifluoropropylmethylsiloxane copolymers, and dimethylvinylsiloxy-terminated methylvinylsiloxane-dimethylsiloxane-3,3,4,4,5,5,6,6,6-nonafluorohexylmethylsiloxane copolymers.

The organohydrogenpolysiloxane comprising component (B) is the crosslinker component. This component must contain at least 2 silicon-bonded hydrogens in each molecule and preferably contains at least 3 silicon-bonded hydrogens in each molecule. The subject component has a viscosity at 25° C. of 1 to 1,000 centipoise and preferably has a viscosity at 25° C. of 5 to 500 centipoise. This component has the formula

wherein $R^4$ can be a hydrogen atom or a substituted or unsubstituted alkyl group, preferably $C_1$ to $C_{10}$ alkyl group. $R^4$ is specifically exemplified by methyl, ethyl, propyl, butyl, octyl, 3,3,3-trifluoropropyl, and 3,3,4,4,5,5,6,6,6-nonafluorohexyl, methyl being preferred. The subscript c has an average value of 1.5 to 3.0. This component is exemplified by straight chain, branched chain, and cyclic structures. In the case of the straight chain and branched chain structures, the molecular chain terminal group is exemplified by the trimethylsiloxy and dimethylhydrogensiloxy groups.

Component (B) is specifically exemplified by trimethylsiloxy-terminated methylhydrogenpolysiloxanes, trimethylsiloxy-terminated dimethylsiloxane-methylhydrogensiloxane copolymers, dimethylhydrogensiloxy-terminated dimethylsiloxane-methylhydrogensiloxane copolymers, dimethylhydrogensiloxy-terminated dimethylsiloxane-methylhydrogensiloxane-3,3,3-trifluoropropylmethylsiloxane copolymers, dimethylhydrogensiloxy-terminated dimethylsiloxane-methylhydrogensiloxane-3,3,4,4,5,5,6,6,6-nonafluorohexylmethylsiloxane copolymers, cyclic methylhydrogenpolysiloxanes, cyclic methylhydrogensiloxane-dimethylsiloxane copolymers, and copolymers composed of the dimethylhydrogensiloxane unit and the $SiO_2$ unit.

Component (B) is added in the range of 0.1 to 40 weight parts per 100 weight parts component (A) and preferably in the range of 1 to 20 weight parts per 100 weight parts component (A). The invention composition does not undergo a thorough cure at component (B) additions below 0.1 weight parts. On the other hand, the cured film afforded by the invention composition exhibits a reduced releasability at component (B) additions in excess of 40 weight parts.

The perfluoroalkyl-containing organosilane comprising component (C) is the component that characterizes the composition of the present invention. It imparts a low surface tension to the cured film and thus functions to generate such properties as water repellency, oil repellency, mold lubrication, stain resistance, and releasability. Component (C) has the following general formula $$C_nF_{2n+1}-R^2-\underset{\underset{R^1}{|}}{Si}H_a \qquad (3\text{-}a)$$

$R^1$ in this formula represents a monovalent hydrocarbon group, exclusive of alkenyl groups, and is exemplified by alkyl groups such as methyl, ethyl, propyl, butyl, pentyl, and so forth; aryl groups such as phenyl, tolyl, xylyl, and so forth; and aralkyl groups such as benzyl, phenethyl, and so forth. Methyl and phenyl are preferred $R^1$ groups. $R^2$ in the preceding formula represents a divalent hydrocarbon group or an ether group-containing hydrocarbon group and is exemplified by alkylene groups such as ethylene, propylene, butylene, pentylene, and so forth; alkyleneoxyalkylene groups such as methyleneoxyethylene, methyleneoxypropylene, ethyleneoxypropylene, and so forth; arylenealkylene groups such as phenyleneethylene, phenylenepropylene, phenylenebutylene, and so forth; and aryleneoxyalkylene groups such as phenyleneoxyethylene, phenyleneoxypropylene, and so forth. Ethylene and propylene are preferred $R^2$ groups. The subscript a in the preceding formula has a value of 2 or 3, and the subscript n in the preceding formula is an integer having a value of 4 to 12. At values of n less than 4 it becomes essentially impossible to impart a low surface tension to the cured film afforded by the invention composition and thus to generate water repellency and oil repellency. On the other hand, handling becomes very difficult when n exceeds 12.

This component is specifically exemplified by organosilanes with the following formulas.

$C_4F_9C_2H_4SiH_3$ $C_6F_{13}C_3H_6SiH_3$ $C_8F_{17}C_2H_4SiH_3$ $C_4F_9C_2H_4Si(CH_3)H_2$ $C_6F_{13}C_2H_4Si(CH_3)H_2$ $C_8F_{17}C_2H_4Si(CH_3)H_2$ $C_4F_9CH_2OC_2H_4SiH_3$ $C_6F_{13}CH_2OC_3H_6SiH_3$ $C_8F_{17}C_2H_4OC_2H_4SiH_3$ $C_4F_9CH_2OC_2H_4Si(CH_3)H_2$ $C_6F_{13}CH_2OC_2H_4Si(CH_3)H_2$ $C_8F_{17}CH_2OC_2H_4Si(CH_3)H_2$

The instant component (C) can be prepared, for example, by the synthesis of perfluorooctylethyltrichlorosilane ($C_8F_{17}CH_2CH_2SiCl_3$) by the addition reaction between perfluorooctylethylene ($C_8F_{17}CH=CH_2$) and trichlorosilane in the presence of hydrosilylation-reaction catalyst and then reduction of the perfluorooctylethyltrichlorosilane with a reductant such as lithium aluminum hydride. (See Japanese Patent Application Number Hei 5-96592, Dow Corning Toray Silicone Company, Limited.)

Component (C) is added at 0.01 to 10 weight parts per 100 weight parts component (A) and preferably at 0.11 to 10 weight parts per 100 weight parts component (A). The effects from this component (low surface tension for the cured film, generation of properties such as water repellency, oil repellency, and so forth) are inadequate at an addition below 0.01 weight parts, while the cured film yielded by the invention composition suffers from a reduced strength at additions in excess of 10 weight parts.

The hydrosilylation-reaction catalyst comprising component (D) is a catalyst that induces crosslinking between the organopolysiloxane comprising component (A) and the organohydrogenpolysiloxane comprising component (B). Component (D) is exemplified by microparticulate platinum adsorbed on a carbon powder support, chloroplatinic acid, alcohol-modified chloroplatinic acid, chloroplatinic acid-olefin complexes, chloroplatinic acid-vinylsiloxane coordination compounds, platinum black, palladium catalysts, and rhodium catalysts. This catalyst is added in an amount sufficient to cure the composition of the invention.

The composition of the present invention is composed of components (A) to (D) as described above. However, it may also contain organic solvent and hydrosilylation-reaction inhibitor. The use of solvent serves to improve the storage stability as well as the coatability for various substrates. Any organic solvent can be used that is capable of dissolving the invention composition to homogeneity, and is exemplified by aromatic hydrocarbons such as trifluorotoluene, hexafluoroxylene, and so forth; aliphatic hydrocarbons such as heptane, hexane, pentane, isooctane, and so forth; halogenated hydrocarbons such as trichloroethylene, perchloroethylene, and so forth; ketones such as methyl ethyl ketone, methyl isobutyl ketone, and so forth; ethers such as tetrahydrofuran and so forth; and ethyl acetate. The hydrosilylation-reaction inhibitor functions to inhibit the catalytic activity of component (D) and thereby improve the storage stability of the invention composition at room temperature. The hydrosilylation-reaction inhibitor is specifically exemplified by alkynyl alcohols such as 3-methyl-1-butyn-3-ol, 3,5-dimethyl-1-hexyn-3-ol, 3-methyl-1-pentyn-3-ol, phenylbutynol, and so forth, and by 3-methyl-3-penten-1-yne, 3,5-dimethyl-1-hexyn-3-ene, cyclic tetra(methylvinylsiloxane), and benzotriazole.

The invention composition is prepared simply by mixing components (A) to (D) to homogeneity. Application of the invention composition to the surface of a substrate such as glass, metal, paper, synthetic resin film, textiles, and so forth, followed by curing, for example, by heating at 120° C. to 150° C. for 20 seconds to 120 seconds, yields a highly water-repellent and highly oil-repellent film on the surface of the substrate.

The invention composition is able to cure into a film that has a low surface tension and thus an excellent water repellency, oil repellency, mold lubrication, stain resistance, and releasability.

EXAMPLES

The present invention is explained in greater detail hereinafter through working examples. In the examples, "parts" denotes "weight parts" and the values reported for the viscosity were measured at 25° C. The water repellency of the curable silicone composition was evaluated in the examples by measuring the contact angle between its cured film and water using a contact angle meter. The oil repellency was evaluated by measuring the contact angles between the cured film from the curable silicone composition and methylene iodide and n-hexadecane using a contact angle meter.

Reference Example 1

Synthesis of Perfluorooctylethyl(methyl)dihydrogensilane

One mole of perfluorooctylethylene ($C_8F_{17}CH=CH_2$) and 0.3 g of a 40 weight % isopropanolic chloroplatinic acid solution were placed in a reactor and heated to 85° C. while stirring. 1.3 moles of methyldichlorosilane was then dripped into this system. After the completion of silane addition, the reaction solution was stirred for an additional 1 hour while holding the temperature at 90° C. Unreacted material was subsequently removed by distillation to yield 0.8 mole of perfluorooctylethyl(methyl)dichlorosilane ($C_8F_{17}CH_2CH_2Si(CH_3)Cl_2$). 5.8 g lithium aluminum hydride and 180 g diethyl ether were placed in a 1,000-mL flask, and 140 g of the perfluorooctylethyl(methyl)dichlorosilane was dripped in at room temperature while stirring. The reaction was heated under reflux for an additional 1 hour after the completion of addition. This was followed by cooling and dripping water into the reaction solution in order to inactivate the excess lithium aluminum hydride. A large volume of water was then added in order to dissolve the salt product, and the organic layer was washed with water. The organic layer was then dried over anhydrous magnesium sulfate and subsequently filtered to yield an organic solution. The reaction product in this organic solution was submitted to analysis by gas chromatography-mass spectroscopy (GC-MS), gas chromatography-infrared spectroscopy (GC-IR), $^{29}Si$ nuclear magnetic resonance ($^{29}Si$-NMR), and $^{13}C$ nuclear magnetic resonance ($^{13}C$-NMR). A single signal at $-31$ ppm was observed by $^{29}Si$-NMR. The results from $^{13}C$-NMR are reported below.

delta (ppm):

| | |
|---|---|
| $-9$ | (1.0C, s, $CH_3$—Si—) |
| 1 | (1.0C, s, —$CH_2$—Si—) |
| 27 | (1.0C, s, —$CH_2$—$CH_2$—Si—) |
| 105-125 | (9.5C, br, $C_8F_{17}$—) |

These results confirmed the reaction product to be perfluorooctylethyl(methyl)dihydrogensilane with the following formula.

$C_8F_{17}CH_2CH_2Si(CH_3)H_2$

Reference Example 2

Synthesis of Perfluorooctylethyltrihydrogensilane

One mole of perfluorooctylethylene ($C_8F_{17}CH=CH_2$) and 0.3 g of a 40 weight % isopropanolic chloroplatinic acid solution were placed in a reactor and heated to 85° C. while stirring. 1.2 moles of trichlorosilane were then dripped into this system. After the completion of silane addition, the reaction solution was stirred for an additional 1 hour while holding the temperature at 90° C. Unreacted material was subsequently removed by distillation to yield 0.85 mole perfluorooctylethyltrichlorosilane ($C_8F_{17}CH_2CH_2SiCl_3$). 6.8 g lithium aluminum hydride and 220 g tetrahydrofuran were placed in a 1,000-mL flask, and 116 g of the perfluorooctylethyltrichlorosilane was dripped in at room temperature while stirring. The reaction was heated under reflux for an additional 1 hour after the completion of addition. This was followed by cooling and dripping water into the reaction solution in order to inactivate the excess lithium aluminum hydride. A large volume of water was then added in order to dissolve the salt product, and the organic layer was washed with water. The organic layer was then dried over anhydrous magnesium sulfate and subsequently filtered to yield an organic solution. The reaction product in this organic solution was submitted to analysis by GC-MS, GC-IR, $^{29}Si$-NMR, and $^{13}C$-NMR. A single signal at $-57$ ppm was observed by $^{29}Si$-NMR. The results from $^{13}C$-NMR are reported below.

delta (ppm):

| | |
|---|---|
| $-3$ | (1.0C, s, —$CH_2$—Si—) |
| 28 | (1.0C, s, —$CH_2$—$CH_2$—Si—) |
| 105-125 | (8.5C, br, $C_8F_{17}$—) |

These results confirmed the reaction product to be perfluorooctylethyltrihydrogensilane with the following formula.

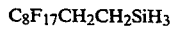

$C_8F_{17}CH_2CH_2SiH_3$

Example 1

The following were dissolved in sufficient toluene to make a total of 500 parts: 100 parts dimethylvinylsiloxy-terminated dimethylsiloxane-methylvinylsiloxane copolymer gum (average degree of polymerization=7,000, 97.4 mole % dimethylsiloxane unit, 2.6 mole % methylvinylsiloxane unit), 3 parts trimethylsiloxy-terminated methylhydrogenpolysiloxane with a viscosity of 30 centipoise, 1 part of the perfluorooctylethyl(methyl)dihydrogensilane $C_8F_{17}CH_2CH_2Si(CH_3)H_2$ synthesized in Reference Example 1, and 0.8 part cyclic tetra(methylvinylsiloxane). The addition to this mixture of chloroplatinic acid-divinyltetramethyldisiloxane complex in a quantity sufficient to give 50 ppm as platinum metal yielded a curable silicone composition. This composition was flow-coated onto the surface of a glass slide and heated for 5 minutes at 150° C. to yield a cured film. The contact angles between this cured film and water, methylene iodide, and hexadecane were measured, and these results are reported in Table 1.

Comparison Example 1

A curable silicone composition was prepared as in Example 1, but in this case omitting the 1 part perfluorooctylethyl(methyl)dihydrogensilane $C_8F_{17}CH_2CH_2Si(CH_3)H_2$ (synthesized in Reference Example 1) that was used in Example 1. A cured film was prepared from this composition by the same procedure as in Example 1. The contact angles between this cured film and water, methylene iodide, and hexadecane were measured, and these results are reported in Table 1.

Example 2

The following were dissolved in sufficient ethyl acetate to make a total of 500 parts: 100 parts dimethylhydroxysiloxy-terminated 3,3,3-trifluoropropylmethylsiloxane-methylvinylsiloxane copolymer gum (average degree of polymerization=6,000, 99 mole % 3,3,3-trifluoropropylmethylsiloxane unit, 1 mole % methylvinylsiloxane unit), 1.1 parts trimethylsiloxy-terminated methylhydrogenpolysiloxane with a viscosity of 30 centipoise, 2 parts of the perfluorooctylethyltrihydrogensilane $C_8F_{17}CH_2CH_2SiH_3$ synthesized in Reference Example 2, and 0.8 part cyclic tetra(methylvinylsiloxane). The addition to this mixture of chloroplatinic acid-divinyltetramethyldisiloxane complex in a quantity sufficient to give 50 ppm as platinum metal yielded a curable silicone composition. This composition was flow-coated onto the surface of a glass slide and heated for 5 minutes at 150° C. to yield a cured film. The contact angles between this cured film and water, methylene iodide, and hexadecane were measured, and these results are reported in Table 1.

Comparison Example 2

A curable silicone composition was prepared as in Example 2, but in this case omitting the 2 parts perfluorooctylethyltrihydrogensilane $C_8F_{17}CH_2CH_2SiH_3$ (synthesized in Reference Example 2) that was used in Example 2. A cured film was prepared from this composition by the same procedure as in Example 2. The contact angles between this cured film and water, methylene iodide, and hexadecane were measured, and these results are reported in Table 1.

TABLE 1

|  | water | methylene iodide | hexadecane |
|---|---|---|---|
| Example 1 | 110 | 71 | 37 |
| Example 2 | 120 | 112 | 57 |
| Comparison Example 1 | 102 | 70 | 36 |
| Comparison Example 2 | 104 | 91 | 51 |

That which is claimed is:

1. A curable silicone composition comprising:
 (A) 100 parts by weight of an organopolysiloxane that has a viscosity at 25° C. of at least 40 centipoise and that contains at least 2 alkenyl groups in each molecule;
 (B) from 0.1 to 40 parts by weight of an organohydrogenpolysiloxane that contains at least 2 silicon-bonded hydrogen atoms in each molecule;
 (C) from 0.01 to 10 parts by weight of a perfluoroalkyl-containing organosilane having the general formula

$$C_nF_{2n+1}-R^2-\underset{\underset{R^1}{|}}{Si}H_a \qquad (3\text{-}a)$$

wherein $R^1$ represents a monovalent hydrocarbon group, $R^2$ represents a divalent group selected from the group consisting of a hydrocarbon group and an ether group-containing hydrocarbon group, a is 2 or 3, and n is a number having a value of 4 to 12, with the proviso that $R^1$ is not an alkenyl group; and
 (D) a catalytic quantity of a hydrosilylation-reaction catalyst.

2. The composition according to claim 1, wherein said organopolysiloxane (A) is selected from the group consisting of dimethylvinylsiloxy-terminated dimethylpolysiloxanes, dimethylvinylsiloxy-terminated methylvinylsiloxane-dimethylsiloxane copolymers, trimethylsiloxy-terminated methylvinylsiloxane-dimethylsiloxane copolymers, dimethylhydroxysiloxy-terminated methylvinylsiloxane-dimethylsiloxane copolymers, dimethylvinylsiloxy-terminated dimethylsiloxane-3,3,3-trifluoropropylmethylsiloxane copolymers, trimethylsiloxy-terminated methylvinylsiloxane-dimethylsiloxane-3,3,3-trifluoropropylmethylsiloxane copolymers, dimethylvinylsiloxy-terminated methylvinylsiloxane-3,3,3-trifluoropropylmethylsiloxane copolymers, dimethylhydroxysiloxy-terminated methylvinylsiloxane-3,3,3-trifluoropropylmethylsiloxane copolymers, and dimethylvinylsiloxy-terminated methylvinylsiloxane-dimethylsiloxane-3,3,4,4,5,5,6,6,6-nonafluorohexylmethylsiloxane copolymers.

3. The composition according to claim 2, wherein said organohydrogenpolysiloxane (B) is selected from the group consisting of trimethylsiloxy-terminated methylhydrogenpolysiloxanes, trimethylsiloxy-terminated dimethylsiloxane-methylhydrogensiloxane copolymers, dimethylhydrogensiloxy-terminated dimethylsiloxane-methylhydrogensiloxane copolymers, dimethylhydrogensiloxy-terminated dimethylsiloxane-methylhydrogensiloxane-3,3,3-trifluoropropylmethylsiloxane copolymers, dimethylhydrogensiloxy-terminated dimethylsiloxane-methylhydrogensiloxane-3,3,4,4,5,5,6,6,6-nonafluorohexylmethylsiloxane copolymers, cyclic methylhydrogenpolysiloxanes, cyclic methylhydrogensiloxane-dimethylsiloxane copolymers, and copolymers composed of the dimethylhydrogensiloxane unit and the $SiO_2$ unit.

4. The composition according to claim 3, wherein said organosilane (C) is selected from the group consisting of $C_4F_9C_2H_4SiH_3$, $C_6F_{13}C_3H_6SiH_3$, $C_8F_{17}C_2H_4SiH_3$, $C_4F_9C_2H_4Si(CH_3)H_2$, $C_6F_{13}C_2H_4Si(CH_3)H_2$, $C_8F_{17}C_2H_4Si(CH_3)H_2$, $C_4F_9CH_2OC_2H_4SiH_3$, $C_6F_{13}CH_2OC_3H_6SiH_3$, $C_8F_{17}C_2H_4OC_2H_4SiH_3$, $C_4F_9CH_2OC_2H_4Si(CH_3)H_2$, $C_6F_{13}CH_2OC_2H_4Si(CH_3)H_2$ and $C_8F_{17}CH_2OC_2H_4Si(CH_3)H_2$.

5. The composition according to claim 4, wherein from 1 to 20 parts by weight of said organohydrogenpolysiloxane (B) are present for each 100 parts by weight of said component (A) and from 0.11 to 10 parts by weight of said organosilane (C) are present for each 100 parts by weight of said component (A).

6. The composition according to claim 1, wherein $R^1$ of said organosilane (C) is methyl.

7. The composition according to claim 2, wherein $R^1$ of said organosilane (C) is methyl.

8. The composition according to claim 3, wherein $R^1$ of said organosilane (C) is methyl.

9. A method for rendering a substrate water and oil repellent comprising coating said substrate with the composition of claim 1 and subsequently curing said composition.

10. A method for rendering a substrate water and oil repellent comprising coating said substrate with the composition of claim 2 and subsequently curing said composition.

11. A method for rendering a substrate water and oil repellent comprising coating said substrate with the composition of claim 3 and subsequently curing said composition.

12. A method for rendering a substrate water and oil repellent comprising coating said substrate with the composition of claim 4 and subsequently curing said composition.

13. A method for rendering a substrate water and oil repellent comprising coating said substrate with the composition of claim 5 and subsequently curing said composition.

14. A method for rendering a substrate water and oil repellent comprising coating said substrate with the composition of claim 6 and subsequently curing said composition.

15. A method for rendering a substrate water and oil repellent comprising coating said substrate with the composition of claim 7 and subsequently curing said composition.

16. A method for rendering a substrate water and oil repellent comprising coating said substrate with the composition of claim 8 and subsequently curing said composition.

* * * * *